3,386,930
SYNTHETIC FILAMENTS OF POLYANHYDRO-
GLUCOSE TRIESTER COPOLYMERS
Joseph G. Santangelo, Morristown, N.J., and Henry W.
Steinmann, Sparta, N.H., assignors to Celanese Corporation, a corporation of Delaware
No Drawing. Filed Sept. 25, 1964, Ser. No. 399,373
20 Claims. (Cl. 260—13)

ABSTRACT OF THE DISCLOSURE

A synthetic filament comprising a copolymer consisting of soft and hard segments, said hard segment comprising a polyanhydroglucose triester, preferably cellulose triacetate having an average molecular weight of from about 1000 to about 5000, an inherent viscosity of about 0.05 to about 0.04 dl./g., an acetyl value of at least 56 percent, said soft segment being represented by a formula selected from the group consisting of

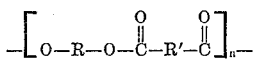

and

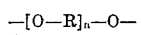

wherein R and R' are organic divalent radicals containing terminal functional groups possessing active hydrogen, preferably a compound selected from the group consisting of low molecular weight polyesters and low molecular weight polyethers, and $n$ is such that the molecular weight ranges from about 250 to about 5000 and a process of producing said filament which comprises extruding an organic solvent solution of an elastomeric, segmented copolymer through at least one jet opening, preferably at a temperature ranging between about 50° C. and about 250° C. into an evaporative atmosphere.

---

This invention relates to a process for producing improved elastomeric fibers. More particularly, this invention relates to the preparation of segmented elastomeric copolymers exhibiting unique physical properties.

Synthetic elastic fibers, the so-called "stretch" fibers, have generally received widespread public acceptance. The properties of these fibers, such as elasticity and a desirable "hand" or feel, make the stretch fibers highly suitable for the preparation of fibers for apparel and like products. It has been the practice in the art to impart stretch properties to synthetic fibers by subjecting the fibers to various processing steps, such as, for example, twisting or crimping operations. These added operations, of course, increase the cost of preparing the stretch fabric and it would be highly desirable to obtain an elastomeric fiber without multiple process steps.

It is an object of this invention to provide elastomeric fibers having a wide range of physical properties particularly suitable for preparing stretch fibers.

It is a further object of this invention to provide a method for producing stretch fibers of segmented, elastomeric copolymers, said fibers exhibiting a wide range of extensibilities and tenacities.

Other objects and the advantages of this invention will be apparent from the following detailed description and claims.

In accordance with this invention, a solution of a segmented, elastomeric copolymer comprising a low molecular weight polyanhydroglucose triester and a polymer having terminal functional groups is extruded through the openings or orifices of a spinnerette into a evaporative atmosphere or heated air to form filaments which are subjected to predetermined drafting. Particularly useful copolymers in the method of this invention are based on the reaction of diisocyanates with the terminal groups of polyesters or polyethers or similar polymers possessing terminal functional groups and with the terminal hydroxyl groups of depolymerized, low molecular weight cellulose triacetate to thereby form an essentially linear copolymer. It should be noted that, although reference is made herein primarily to copolymers comprising low molecular weight cellulose triacetate linked by means of isocyanate groups to polymers having terminal functional groups, the invention is also applicable to copolymers of low molecular weight cellulose triacetate wherein linking agents other than isocyanates are utilized. Examples of these are phosgene to form carbonate linkages, diacid chloride or dianhydrides such as isophthalyl chloride and mellitic anhydride to form ester linkages, and difunctional silanes such as dichlorodimethyl silane to form ether linkages. The segmented, elastomeric copolymers prepared according to this invention yield fibers which exhibit a broad spectrum of extensibilities and which are, accordingly, highly suitable for the preparation of stretch fabrics. It is an especially advantageous feature of this invention that a fiber for stretch fabrics may be obtained without any additional process operation such as crimping or twisting.

As was mentioned previously, copolymers of especial interest are prepared from low molecular weight cellulose triacetate, polyesters or polyethers and diisocyanates. Illustrative examples of polyhydroxyl compounds which may be used to prepare the polyester or polyether segments of this invention include: ethylene glycol, diethylene glycol, triethylene glycol, pentamethylene glycol, hexamethylene glycol, decamethylene glycol, dodecamethylene glycol, propylene glycol, 1,2-propylene glycol, 1,3-propylene glycol, butanediol-1,2, butanediol-2,3, butanediol-1,3, butanediol-1,4, isobutylene glycol, pinacol, hexanediol-1,4, pentanediol - 1,5, 2 - methyl-2-4-pentanediol, heptanediol-1,7, heptanediol-1,4, thiodiglycol, n-butyldiethanolamine, N,N-diethanolaniline, hydroquinonediglycol ether, trans-hexahydroxylene glycol, m - dihydroxybenzene, o - dihydroxybenzene.

Representative of the dicarboxylic acids which may be employed with dihydroxy compounds to prepare the polyester segments of this invention include: adipic, beta-methyl adipic, azelaic, fumaric, glutaric, 2-phenylglutaric, malic, maleic, malonic, sebacic, suberic, succinic, pimelic, 4-ketopimelic, itaconic, dehydromuconic, decane-1, 10-dicarboxylic, ketoundecanedioic, acetylenedicarboxylic, acetone dicarboxylic, diphenic, p - phenylenediacetic, phthalic, isophthalic, terephthalic, hexahydroterephthalic, cyclopentane-1,2-dicarboxylic, cyclopentane-1,3-dicarboxylic, cyclohexene-1,2-dicarboxylic, cyclohexane-1,3-dicarboxylic, cyclohexane-1,4-dicarboxylic, naphthalene-1,2-dicarboxylic, naphthalene-1,3-dicarboxylic, naphthalene-1,4-dicarboxylic, naphthalene-1,5-dicarboxylic, diphenylene-2,2-dicarboxylic, diphenylene-4,4'-dicarboxylic, diphenylene-2,4'-dicarboxylic, xylylene-1,4-dicarboxylic, xylylene-1,3-dicarboxylic, xylylene-1,2-dicarboxylic and camphoric.

The method selected to prepare the polyesters or polyethers is not critical to this invention and it is contemplated that any of the synthetic methods well-known in the art may be employed to obtain these polymers.

Suitable polyethers or polyesters which may be prepared from the polyhydroxyl and polycarboxyl compounds listed previously include, for example, poly (ethylene glycol); poly(tetramethylene oxide); poly-ethylene ether glycol, and, the reaction products of: ethylene glycol and adipic acid; diethylene glycol and adipic acid; propanediol and sebacic acid, ethylene glycol, propylene glycol, and adipic acid; adipic acid, phthalic acid, and hexanetriol; 2,2-dimethyl-1,2-propanediol and sebacyl chloride; 2,2-dimethyl-1,3-propanediol and dimethyl sebacate.

A variety of organic diisocyanates may be used in the process of the present invention. Illustrative examples of these polyisocyanates are: trimethylene diisocyanate, tetramethylene diisocyanate, pentamethylene diisocyanate, hexamethylene diisocyanate, decamethylene diisocyanate, cyclopentylene-1,3-diisocyanate, 1,4-diisocyanate cyclohexane, p-phenylene diisocyanate, m-phenylene diisocyanate, the tolylene diisocyanates, the naphthalene diisocyanates, 4,4'-diphenyl propane diisocyanate, and 4,4'-diphenylmethane diisocyanate.

The copolymers used to prepare the fibers of this invention are essentially linear, segmented, elastomeric copolymers comprising two principle types of segments chemically connected and alternating in the chemical chain. One segment, preferably essentially amorphous, may be derived from low melting soft polymers, such as, for example, polyesters, polyethers, and the like; the other segment is derived from depolymerized, low molecular weight cellulose triacetate segments.

In particular, the soft segments of these elastomers are derived from low melting polymers having a melting point below about 60° C., having a molecular weight from about 250 to about 5,000, and containing terminal radicals possessing active hydrogen atoms. These soft segments, as present in the elastomer, appear as radicals of the initial polymers from which the terminal active hydrogen atoms have been removed. Generally, the hard, high melting segments comprise from about 20% to about 60% by weight of the segmented copolymer and may be defined as comprising at least one repeating unit of the linear hard polymer from which they are derived.

A suitable soft segment of the copolymers used in this invention may be represented by the formulae

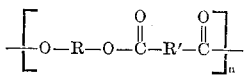

and

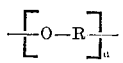

when R and R' are divalent organic radicals containing terminal functional groups possessing active hydrogen and $n$ is such that the molecular weight ranges from about 250 to about 5,000.

Although the polyesters or polyethers or similar soft polymers can have a wide variety of terminal functional active hydrogen atoms, such as, for example, hydroxyl, amino, carboxyl and amido, it is preferred to employ compounds terminated with carboxyl groups or hydroxyl groups. Thus when compounds with terminal hydroxyl groups are employed, the reaction of these compounds with the organic diisocyanate forms urethane links. Compounds terminated with carboxyl groups, on reaction with the organic diisocyanate, yield primarily amide linkages. The hard segments of the copolymers are derived from the low molecular weight cellulose triacetate segments.

The low molecular weight cellulose triacetate segments employed in preparing the elastomeric fibers of this invention may be prepared according to the depolymerization process set forth in U.S. patent application 379,386, filed June 30, 1964. As disclosed in the above-mentioned patent application, the cellulose triacetate segments generally have melting points lying in the range of from about 240° C. to about 295 C. and in some instances, may even have lower melting points. The inherent viscosity of the low molecular weight cellulose triacetate can vary over a wide range. Usually, the I.V. is within the range of from about 0.05 dl./g. to about 0.40 dl./g., although triacetate having either a higher or a lower I.V. can be obtained depending upon the depolymerization conditions employed and the extent of depolymerization effected.

The acetyl value of the cellulose triacetate segments obtained from the depolymerization step of the process of the above-mentioned application depends both upon the extent of the depolymerization and whether or not trioxane or dioxolane were present during the depolymerization. Thus, for example, in the absence of trioxane or dioxolane during the depolymerization of 62.5% A.V. cellulose triacetate starting material, the A.V. of the segments have been found to be generally in the range of about 60 to about 62.5%. On the other hand, however, in the depolymerization of the same starting material cellulose triacetate in the presence of trioxane or dioxolane the A.V. of the segment is lower and is related to the percentage of oxymethylene that actually combines with the depolymerized cellulose triacetate. In the case of depolymerizations conducted in the presence of dioxolane, the percent of oxymethylene introduced into the cellulose triacetate segment usually varies from about 0.1 to 1.5% by weight as based on the weight of the depolymerized cellulose triacetate and the A.V. usually lies between about 59 and 62%. In the case of depolymerization conducted in the presence of trioxane, the percentage of oxymethylene introduced into the segment usually varies from about 0.1 to about 10% and the A.V. usually lies between about 56 and about 62%.

The hydroxyl content of the depolymerized cellulose triacetate segments, as determined by acetylation in pyridine at elevated temperature, is usually in the range of from about 0.1 to about 1.0% depending upon the extent of depolymerization. The lower the I.V. or the molecular weight of the segments, the higher is the hydroxyl content and vice versa. It has been found that depolymerization carried out in the presence of trioxane tends to give lower hydroxyl values as compared to depolymerizations carried out in the presence of dioxolane.

These low molecular weight cellulose triacetate products are white and may be powdery, granular or fibrous depending upon the degree of depolymerization. They are also soluble in methylene chloride and other typical solvents for cellulose triacetate. The intermediates vary in melting point depending upon the degree of depolymerization with the melting point decreasing as the extent of depolymerization increases.

The low molecular weight cellulose triacetate can generally be described as having an average molecular weight of about 1,000 to about 5,000 as determined by the Rast method and an I.V. generally in the range of 0.05 to 0.4 dl./g. The process of this invention, however, is not limited to the employment of low molecular weight cellulose triacetate having properties within the above-mentioned ranges but is also operable employing low molecular weight cellulose triacetate having molecular weights both smaller and larger than those mentioned above and having an I.V. also larger and smaller than those mentioned bove.

The low molecular weight cellulose triacetate employed in the polymerization step to prepare the fibers of this invention contains functional terminal groups, preferably hydroxyl groups. Furthermore, the low molecular weight cellulose triacetate is substantially a triacetate, i.e., the depolymerization occurred under conditions that substantially maintained the original acetate groups intact.

The properties of the final segmented copolymer products depend essentially upon the particular components used in the reaction, the composition of the components in the reaction medium and the method of preparation of the copolymers. Thus, for example, a determining factor in the properties of the copolymers is the weight ratio of the low molecular weight cellulose triacetate to low molecular weight polyester or polyether. While the ratio of cellulose triacetate to polyester or polyether can vary over wide limits, a ratio of about 2:1 yields a flexible copolymer and a ratio of about 1:1 yields an elastic copolymer. Fibers prepared from the copolymers of this invention, as was mentioned previously, exhibit a wide range of tenacities and elongations. Thus, fibers can be prepared having tenacities ranging from about 0.2 grams per denier to about 1.2 grams per denier, with the preferred range being from 0.8 to 1.0 gram per denier. Fibers can also be prepared having elongations ranging 50 to 1000%, with the preferred range being from 500 to 1000%.

The amount of organic diisocyanate employed is also a critical factor in the determination of the properties of the final segmented copolymers. The amount of diisocyanate required will also depend on the weight ratio of triacetate to polyether or polyester. If the proper stoichiometry be used, however, soluble linear segmented copolymers can be obtained. Generally, when a diisocyanate is employed, a molar ratio of diisocyanate to the polyester or polyether in a range from about 2.5:1 to 1.5:1 and preferably in a molar range from about 2:1 to 1.5:1 is utilized. If an excess of diisocyanate is employed the reaction solution tends to gelatinize, but, the rate at which gelatinization takes place can be controlled by varying the concentration of the other reactants in the reaction solution and also by varying the temperature. In those situations where the reaction solution gels, it is believed that cross-linking has taken place resulting in a polymer having a three-dimensional network.

The polymerization reaction of this invention can be carried out in a medium comprised of an organic solvent, particularly halogenated hydrocarbons, such as, for example, chlorinated lower alkylenes. It has been found that the employment of ethylene chloride or methylene chloride or mixtures thereof to be extremely desirable as a reaction medium. Advantages of employing ethylene chloride and/or methylene chloride will be discussed below.

The polymerization step of the invention is catalyzed by tertiary amines, such as, for example, triethylamine, tributylamine and N-methylmorpholine. Further, the polymerization reaction can be carried out at room temperature or at an elevated temperature and at an atmospheric pressure or at autogenous pressure.

The organic diisocyanate can be added to a solution of the low molecular weight cellulose triacetate and low molecular weight polyester or polyether. Alternatively, the organic diisocyanate can be first reacted with a low molecular weight cellulose triacetate to give segments having residual isocyanate groups and these segments in turn reacted with the low molecular weight polyester or polyether. Still another sequence of addition is first reacting the organic diisocyanate with the low molecular weight polyester or polyether to give segments having residual isocyanate groups and then reacting these segments with the low molecular weight cellulose triacetate. It is believed that the first sequence tends to give random type segmented copolymers whereas the other two sequences tend to give more orderly alternating segmented copolymers. It is preferred to first react the organic diisocyanate with the low molecular weight polyester or polyether at a temperature in the range of from about 80° to about 120° C. to produce isocyanate capped blocks and then react the capped blocks with the low molecular weight cellulose triacetate at a temperature in the range of from about 25° to about 80° C. Whichever sequence of addition is selected, however, it is most desirable that the reactions be carried out under anhydrous conditions in an inert atmosphere, such as, for example, dry nitrogen.

An advantage of employing methylene chloride and/or ethylene chloride as the reaction medium is that these compounds are excellent solvents for the final copolymers as well as for the reactants. Furthermore, the use of such solvents permits the reaction system to be conveniently dried by azeotropic distillation prior to adding the organic diisocyanate. Generally, this procedure consists of dissolving a low molecular weight polyester or polyether in a small amount of the ethylene chloride and then drying the system by azeotropic distillation leaving a more highly concentrated solution of the polyester or polyether. The organic diisocyanate is then added and reacted with the polyester or polyether. Meanwhile, in a separate vessel the low molecular weight cellulose triacetate is dissolved in methylene chloride and/or ethylene chloride, and this system is also dried by azeotropic distillation. Still further drying can be accomplished by passing the solution through a bed of silica gel. After the reaction of the low molecular weight polyester or polyether with the organic diisocyanate is substantially completed, the dry solution of low molecular weight cellulose triacetate in the chlorinated hydrocarbon is added for reaction.

It has been found that the rate of reaction is catalyzed by tertiary amines but is also dependent upon the concentration of the reactants in the solution and the temperature. Secondarily, the rate of reaction is also dependent upon the amount of organic diisocyanate present. Polymerization is evidenced initially by an increase in the viscosity of the solution and in the final aspects by an increase in the I.V. of the final reaction product. Generally, the conditions for increased rate of reaction are high temperature, high concentration of reactants and excessive amounts of organic disocyanate. In some instances, however, it is actually desirable to retard the reaction in the later stages of polymerization, particularly when excessive amounts of organic diisocyanates are employed. Reaction inhibition can be conveniently accomplished by diluting the reaction solution and/or carrying out the reaction at lower temperatures. The purpose of retarding the polymerization reaction in the later stages when employing an excess of diisocyanate is to prevent gelation.

The segmented copolymers obtained according to this invention have sufficiently higher I.V.'s than those of the starting materials and the preferred product copolymers are soluble in several of the well-known organic solvents, such as, for example, chlorinated hydrocarbons and dimethyl formamide. If the reaction solution gels, however, the product of the reaction is no longer soluble in the above-mentioned solvents but will swell to transparent gels. In such instances, hot dimethyl formamide (steam bath) will "degelatinize" the swollen gels resulting in a smooth but comparatively low viscosity solution. On precipitation in water or ethyl alcohol, filtering and drying, the "degelatinized" products do not have properties as desirable as those of the products isolated before gelation takes place, and, therefore, gelation is generally to be avoided.

The preferred copolymer products used in this invention generally soften and melt at temperatures below that for high molecular weight cellulose triacetate. Generally, the higher the weight ratio of low molecular weight cellulose triacetate to low molecular weight polyester or polyether the higher is the melting point of the product. Thus, for example, a product obtained from a 1:1 ratio may have a melting point of about 240° C., while a product obtained from a 2:1 ratio may have a melting point of about 275° C.

It should be noted that the process of this invention is not restricted to the preparation of those segmented copolymers which comprise alternating soft and hard segments. The invention also contemplates the formation of copolymers of depolymerized cellulose triacetate wherein the soft and hard segments do not alternate but rather one of these segments constitutes a predominant part of the copolymer chain uninterrupted by the other in a random type polymerization.

Suitable polymers in the molecular weight range of about 250 to about 5,000 which may be employed in virtually any proportion with the low molecular weight cellulose triacetate include, for example, poly(tetramethylene oxide) glycols, poly(hexamethylene oxide) glycols, poly(propylene oxide) glycol, poly(ethylene oxide) gycol, polyethylene adipate, polyester of diethylene glycol and adipic acid, polyethylene sebacate and polyester of diethylene glycol and sebacic acid.

In spinning filaments derived from the elastomeric copolymers described previously, any conventional method of dry spinning may be utilized. Ordinarily, a solution of the copolymer is passed through a candle filter unit mounted at the top of a cabinet and thence to a spinnerette where it is extruded through a plurality of orifices in the face of the spinnerette. The filaments pass downwardly in the spinning cabinet while progessively losing solvent by evaporation until, in a substantially solidified and dried condition, they leave the cabinet and pass around a godet roll or similar device which imparts the desired draft to the filaments.

It is an interesting feature of this invention that the copolymer reaction mixture continues to undergo reaction in the spinning process, that is, the polymerization proceeds to completion in the spun fiber. Not only does this feature tend to optimize the properties of the fiber, but it also has the further advantage of eliminating the usual steps of precipitating the copolymer, washing and drying the copolymer, and then resolutioning the copolymer for spinning. In order to facilitate the continued polymerization of the copolymer in the fiber, it is preferred to maintain the evaporative gas in the cabinet at a temperature ranging from about 50° to about 250° C. Although it is preferred that the polymerization be continued in the spun fiber, it is also within the purview of this invention to precipitate the polymer, wash and dry it, and thereafter resolution the polymer.

The filaments, upon exiting from the spinning column, may be subjected to after-treatments in accordance with the needs of the practitioner. Thus, for example, the filaments may be stretched and relaxed and/or subjected to heat treatment. Any conventional twister guide or similar guide means may be employed to remove the filament from the cabinet.

In summary, then, elastomeric fibers suitable for making stretch fabrics have been derived from segmented copolymers with a minimum of process steps and without detrimentally affecting the properties of the fibers.

In the following examples, which further illustrate the embodiment of this invention, all parts given are by weight unless otherwise indicated.

Example I 240 grams of depolymerized cellulose triacetate having the following properties:

Acetyl value, percent acetic acid _____ 59.5
Hydroxyl content, percent _____ 0.92
Rast molecular weight _____ 3,275
Percent oxymethylene _____ 1.0 were dissolved in a mixture of 1200 ml. of methylene chloride and 600 ml. of ethylene chloride. The solution was heated with agitation and azeotropically distilled to dry the system. About 600 ml. of distillate were collected.

Into another vessel equipped with stirrer, thermometer, nitrogen inlet and Stark and Dean trap with condenser and drying tube attached, were charged 360 grams of a polyester prepared from equimolar amounts of diethylene glycol and adiphic acid (mol wt. about 2,800, hydroxyl content=1.21%, and I.V.=0.10). A volume of 150 ml. of ethylene chloride was then added to the vessel and the solution was heated with stirring and was azeotropically distilled in order to dry the system. To the concentrated polyester solution were added 50.0 grams of methylene bis(4-phenyl isocyanate). This solution was heated with good agitation at 80° C. for three hours. The solution was cooled to 50° C. and then the dry solution of low molecular weight cellulose triacetate in the mixture of ethylene chloride and methylene chloride was added. This reaction mixture was heated with stirring, and distillation was carried out until a temperature of 75° C. was reached. A volume of 200 ml. of dry ethylene chloride was added to the reaction solution followed by the addition of 2 ml. of triethylamine catalyst. The solution was then heated with stirring at 75° C. for thirty-one hours, yielding a dope having a Brookfield viscosity of 270 poises at 25° C. and a solids content of 26.0%.

The dope was then extruded through a 1 x 20 x .036 dry spinning jet into a downdraft 23 foot spinning cabinet. The jet level air temperature was 100° C. with the bottom cabinet temperature equal to 200° C. The filaments, on passing from the cabinet, were stretched to 90% of the break point, relaxed and packaged. The product had the following properties:

|  | As Spun | Boiled Off |
|---|---|---|
| Tenacity, grams/denier | 0.51 | 0.42 |
| Elongation, percent | 410 | 530 |
| Modulus at 300%, g./d | 0.28 | 0.14 |

Example II

A series of segmented copolymers were prepared in the same manner as that described in Example I, with the exception that the ratio of low molecular weight cellulose triacetate:polyester was varied. The results in terms of fiber properties are shown in Table I.

TABLE I.—SUMMARY OF BLOCK POLYMER SPINNING EXPERIMENTS
[Jet: 1 inch x 10 holes x 0.070 mm. Cabinet Temperature, ° C: 100–200]

| Polymer Composition¹ | Ten., g./d. | Elong., percent | Stress at 300% strain, g./d. | Perm. Set, percent | Remarks |
|---|---|---|---|---|---|
| A. CTA, 48%; Polyester, 48% and TDI, 4% | 0.30 / 0.40 | 580 / 410 | 0.17 / 0.29 | 88 / 67 | As spun. / Boiled off. |
| B. CTA, 47%; Polyester, 47%; and MDI, 6% | 0.40 / 0.70 | 600 / 300 | 0.10 / 0.60 | 60 / 40 | 0% Spin Stretch. / 440% Spin Stretch. |
| C. CTA, 37%; Polyester, 55.5% and MDI, 7.5% | 0.48 / 0.53 | 420 / 510 | 0.27 / 0.22 | 29 / 10 | As spun. / After Stretched. |

¹ CTA=cellulose triacetate; TDI=2,4-toluene diisocyanate; MDI=Methylene bis(4-phenyl isocyanate).

Example III 120 grams of depolymerized cellulose triacetate having an A.V. of 62.8% (% acetic acid), a hydroxyl content of 1.14%, and a Rast molecular weight of 1,370 was reacted (in the manner described in Example I) with 180 grams of the polyester of Example I, 25.0 grams of methylene bis(4-phenyl isocyanate) and 1.8 grams of 2,4-toluene diisocyanate.

The reaction solution in methylene chloride was concentrated to a solids content of 29% and a Brookfield viscosity of 227 poises. The dope was spun in the manner described in Example I. The resulting fiber had a tenacity of 0.26 g./d., elongation of 579% and a modulus of 0.11 g./d. at 300% elongation. Further stretching (to 90% of break point) gave a fiber with a tenacity of 0.42 g./d., an elongation of 316% and a modulus of 0.07 g./d. at 300% elongation.

Example IV 91 grams of depolymerized cellulose triacetate having an A.V. of 62.8% (% acetic acid), a hydroxyl content of 1.14%, and a Rast molecular weight of 1,370 was reacted (in the manner described in Example I) with 104 grams of polytetramethylene glycol ether having a molecular weight of 2,850, 13.8 grams of methylene bis(4-phenyl isocyanate) and 3.0 grams of 2,4-toluene diisocyanate. The reaction solution was concentrated to yield a dope having a viscosity of 487 poises at 27° C. and a solids content of 24.2%. The dope was spun in the manner described in Example I. The resulting fiber had the following properties:

|  | Tenacity (g./d.) | Elongation (percent) |
|---|---|---|
| As spun | 0.22 | 99 |
| Boiled off | 0.21 | 99 |
| Boil off shrinkage, percent | | 2.6 |

Example V 240 grams of depolymerized cellulose triacetate having an A.V. of 59.7, a hydroxyl content of 0.55, an I.V. of 0.16 (in 9/1 methylene chloride/methanol), a Rast molecular weight of 2700, and an oxymethylene content of 0.93% was reacted (in the manner of Example I) with 240 grams of the polyester of Example I, and 18.0 mls. of 2,4-toluene diisocyanate.

The copolymer was precipitated from methylene chloride solution by pouring into 2B alcohol (i.e., denatured ethyl alcohol having 0.5 gallons of benzene in each 100 gallons of ethanol), collected, washed with 2B alcohol and then soaked in a solvent mixture of 2 volumes of 2B alcohol and 1 volume of acetone for 4 days. The polymer was collected and dried in a vacuum oven at 60° C. The resulting polymer had an I.V. of 1.29 dl./g. (as measured in 9/1 methylene chloride/methanol solution) and melted at 268–275° C.

A dope was prepared by dissolving the polymer in dry methylene chloride and concentrating the solution of 27% solids and a Brookfield viscosity of 259 poises. The dope was spun under spinning conditions similar to those described in Example I. The resulting fiber properties are set forth in Table II.

TABLE II

| Sample | Spin Stretch, Percent | Denier | Ten., g./d. | Elong., Percent | Stress at 300% Strain, g./d. |
|---|---|---|---|---|---|
| A. As spun | 0 | 56 | 0.30 | 575 | 0.17 |
| B. As spun | 175 | 32 | 0.40 | 275 | 0.39 |
| A. Boiled-off, ½ hour | | 52 | 0.38 | 407 | 0.29 |
| B. Boiled-off, ½ hour | | 30 | 0.42 | 276 | |
| A. Heat treated relaxed for 16 hours at 120° C | | 74.6 | 0.23 | 671 | 0.10 |
| A. Heat treated at constant length for 16 hours at 120° C | | 55 | 0.25 | 541 | 0.15 |

Any departure from the above description which conforms to the present invention is intended to be included within the scope of the invention as defined by the following claims.

The embodiments of the invention in which an exclusive property or privilege is claimed are defined as follows:

1. The method comprising extruding an organic solvent solution of an elastomeric, segmented copolymer through at least one jet opening, said copolymer consisting of soft and hard segments, said hard segment comprising cellulose triacetate having an average molecular weight of from about 1000 to about 5000, an inherent viscosity of from about 0.05 to about 0.4 dl./g., and an acetyl value of at least about 60%, and said soft segment being represented by a formula selected from the group consisting of

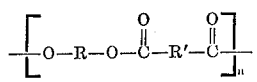

and

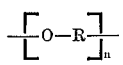

wherein R and R' are organic divalent radicals containing terminal functional groups possessing active hydrogen and $n$ is such that the molecular weight ranges from about 250 to about 5000.

2. The method of claim 1 wherein said organic solvent solution is extruded at a temperature ranging between about 50° and about 250° C.

3. The method of claim 1 wherein said organic solvent solution is extruded into an evaporative atmosphere.

4. The method comprising extruding an organic solvent solution of an elastomeric, segmented copolymer through at least one jet opening, said copolymer consisting of soft and hard segments, said hard segments comprising cellulose triacetate having an average molecular weight of from about 1000 to about 5000, an inherent viscosity of from about 0.05 to about 0.4 dl./g., an acetyl value of at least about 56%, and an oxymethylene content ranging from about 0.1 to about 10%, and said soft segment being represented by a formula selected from the group consisting of

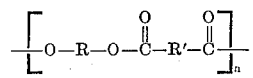

and

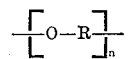

wherein R and R' are organic divalent radicals containing terminal functional groups possessing active hydrogen and $n$ is such that the molecular weight ranges from about 250 to about 5000.

5. The method of claim 4 wherein said organic solvent solution is extruded at a temperature ranging between about 50° and about 250° C.

6. The method of claim 4 wherein said organic solvent solution is extruded into an evaporative atmosphere.

7. The method comprising extruding an organic solvent solution of an elastomeric, segmented copolymer through at least one jet opening, said copolymer comprising the reaction product of a low molecular weight polyanhydroglucose triester, a polymer having terminal functional groups possessing active hydrogen and an organic diisocyanate.

8. The method of claim 7 wherein said polyanhydroglucose triester is cellulose triacetate having an average molecular weight of from about 1000 to about 5000, an inherent viscosity of from about 0.05 to about 0.4 and an acetyl value of at least about 60%.

9. The method of claim 7 wherein said polyanhydroglucose triester is cellulose triacetate having an average molecular weight of from about 1000 to about 5000, an inherent viscosity of from about 0.05 to about 0.4 dl./g., an acetyl value of at least about 56%, an oxymethylene content ranging from about 0.1 to about 10%.

10. The method of claim 7 wherein said polymer having terminal functional groups is selected from the group consisting of low molecular weight polyesters and low molecular weight polyethers, said polyesters and polyethers having an average molecular weight of from about 250 to about 5000 and melting below about 60° C.

11. The method of claim 7 wherein said organic solvent solution is extruded at a temperature ranging between about 50° and about 250° C.

12. The method of claim 7 wherein said organic solvent solution is extruded into an evaporative atmosphere.

13. The method comprising extruding an organic solvent solution of an elastomeric, segmented copolymer through at least one jet opening, said copolymer comprising the reaction product of a low molecular weight polyanhydroglucose triester, and a polymer having terminal functional groups possessing active hydrogen.

14. The method of claim 13 wherein said cellulose triacetate has an average molecular weight of from about 1000 to about 5000, an inherent viscosity of from about 0.05 to about 0.4 dl./g., and an acetyl value of at least about 60%.

15. The method of claim 13 wherein said cellulose triacetate has an average molecular weight of from about 1000 to about 5000, an inherent viscosity of from about 0.05 to about 0.4 dl./g., an acetyl value of at least about 56%, and an oxymethylene content ranging from about 0.1 to about 10%.

16. The method of claim 13 wherein said polymer having terminal functional groups is selected from the group consisting of low molecular weight polyesters and low molecular weight polyethers, said polyesters and polyethers having an average molecular weight of from about 250 to about 5000 and melting below about 60° C.

17. The method of claim 13 wherein said organic solvent solution is extruded at a temperature ranging between about 50° C. and about 250° C.

18. The method of claim 13 wherein said organic solvent solution is extruded into an evaporative atmosphere.

19. A synthetic filament comprising an elastomeric, segmented copolymer, said copolymer consisting of soft and hard segments, said hard segment comprising cellulose triacetate having an average molecular weight of from about 1000 to about 5000, an inherent viscosity of from about 0.05 to about 0.4 dl./g., and an acetyl value of at least about 60%, and said soft segment being represented by a formula selected from the group consisting of

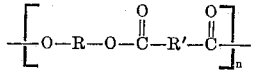

and

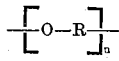

wherein R and R' are organic divalent radicals containing terminal functional groups possessing active hydrogen and $n$ is such that the molecular weight ranges from about 250 to about 5000, said filament having a tenacity ranging from 0.2 to about 1.2 grams per denier and an elongation ranging from about 50% to about 1000%.

20. A synthetic filament comprising an elastomeric, segmented copolymer, said copolymer consisting of soft and hard segments, said hard segment comprising cellulose triacetate having an average molecular weight of from about 1000 to about 5000, an inherent viscosity of from about 0.05 to about 0.4 dl./g., an acetyl value of at least about 56%, and an oxymethylene content ranging from about 0.1 to about 10%, and said soft segment being represented by a formula selected from the group consisting of

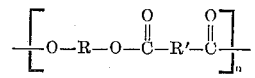

and

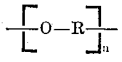

wherein R and R' are organic divalent radicals containing terminal functional groups possessing active hydrogen and $n$ is such that the molecular weight ranges from about 250 to about 5000, said filament having a tenacity ranging from about 0.2 to about 1.2 grams per denier and an elongation ranging from about 50% to about 1000%.

References Cited

UNITED STATES PATENTS 2,437,687   3/1948   Dreyfus et al. _____ 264—176

WILLIAM H. SHORT, *Primary Examiner.*

J. NORRIS, *Assistant Examiner.*